Aug. 24, 1948.  O. H. BANKER  2,447,552
TRANSMISSION
Filed March 6, 1944  2 Sheets-Sheet 1

INVENTOR.
Oscar H. Banker,
BY
Cromwell, Greist Warden + Butler
attys.

Aug. 24, 1948.   O. H. BANKER   2,447,552
TRANSMISSION
Filed March 6, 1944   2 Sheets-Sheet 2

INVENTOR.
Oscar H. Banker.
BY
Cromwell Graist Warden + Butler
attys.

Patented Aug. 24, 1948

2,447,552

UNITED STATES PATENT OFFICE 2,447,552

TRANSMISSION

Oscar H. Banker, Evanston, Ill., assignor to New Products Corporation, Chicago, Ill., a corporation of Delaware Application March 6, 1944, Serial No. 525,145

6 Claims. (Cl. 74—368)

This invention has to do with transmissions for heavy duty automotive vehicles, such as military tractors, tanks, bulldozers, and the like, and is particularly concerned with the provision of an auxiliary mechanism for emergency use upon occasion in quickly increasing the multiplication of torque obtainable with an associated variable speed device without the usual loss of torque which occurs with conventional gearing during de-clutching when manually shifting from one gear ratio into a lower gear ratio.

The invention resides in the provision of a new and useful mechanism for this purpose, which mechanism is simple and compact in construction, will stand up under the most severe operating conditions, is easy to manipulate, and will function instantaneously to establish a lower gear ratio without interruption in the delivery of power to the driven shaft.

While the foregoing statements are indicative in a general way of the nature of the invention, other more specific objects and advantages will be apparent to those skilled in the art upon a full understanding of the construction, arrangement, operation and control of the improved auxiliary mechanism.

A preferred embodiment of the invention is presented herein by way of exemplification but it will, of course, be appreciated that the invention is susceptible of incorporation in other structurally modified forms coming equally within scope of the appended claims.

Figure 1:
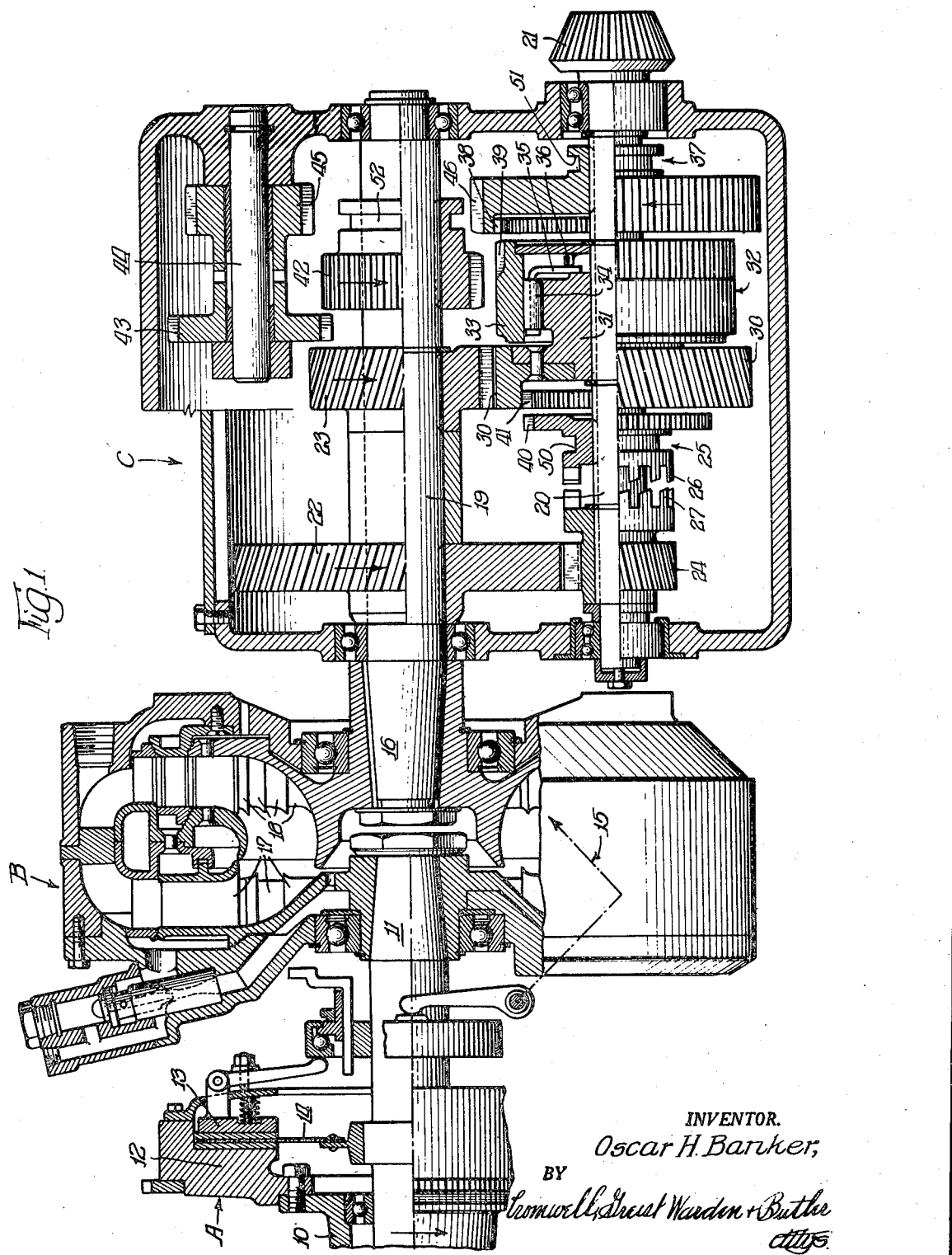
Figure 2:
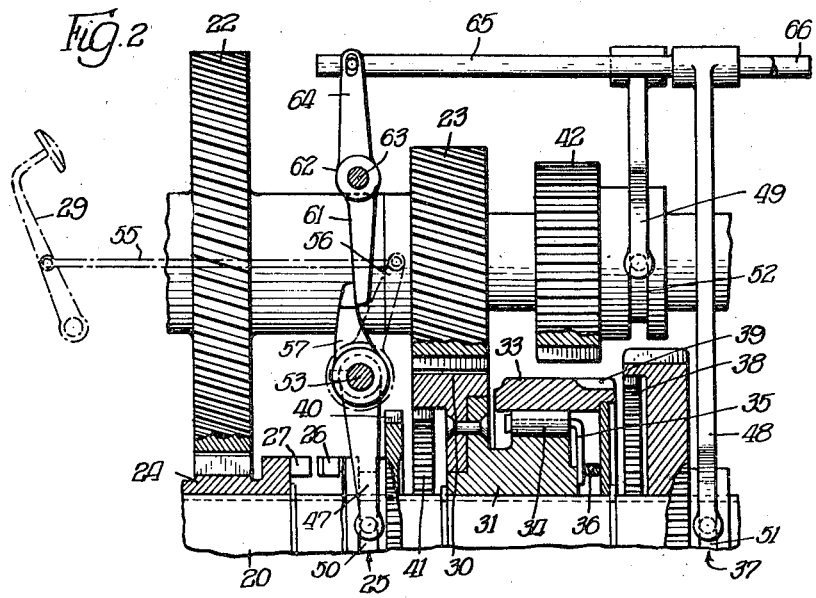
Figure 3:
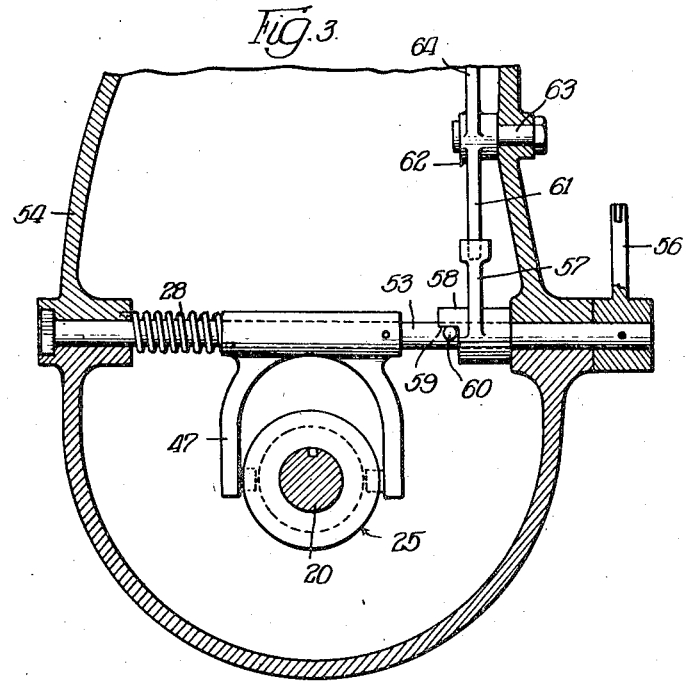

In the accompanying drawings:

Fig. 1 is a composite longitudinal section through the center of a variable speed transmission assembly equipped with an auxiliary mechanism constructed in accordance with the invention—the section through the main transmission and through the auxiliary mechanism at the rear end of the main transmission being taken on a vertical plane, and the section at the upper right hand end of the view through the reverse gearing for the auxiliary mechanism being taken on a different plane;

Fig. 2 is a side view of the manually operable control means for the auxiliary mechanism; and Fig. 3 is a front end view of the same control means.

The assembly shown in Fig. 1 of the drawings includes a friction clutch A, a hydraulic torque converter B, and an auxiliary transmission C. The present invention resides in the novel construction, arrangement, operation and control of the several cooperating elements which combine to form the auxiliary transmission C—the friction clutch A and the hydraulic torque converter B being shown merely for the purpose of completing the assembly.

The auxiliary transmission C is capable of modifying the usual action of the torque converter B to the extent of providing three speeds in forward and one in reverse. The assembly is normally operated with the auxiliary transmission C in its "high gear" ratio, with the torque converter B affording the multiplication of torque necessary to start the vehicle rolling and keep it rolling on all but unusually steep grades. When the vehicle is confronted with an obstruction or with a grade which will over-tax the capacity of the torque converter B in its highest multiplication ratio the operator may shift the auxiliary transmission instantaneously into a "low gear" ratio without having to first throw out the engine clutch and without any substantial interruption in the delivery of power to the driven shaft.

This low gear pick-up is effected through the employment of an ovrrunning clutch in combination with low ratio gears which only come into action upon the disconnection of higher ratio gears. There are times when it is desirable in a transmission of this character to shift into a low gear ratio in order to obtain a braking effect, as when going down steep grades. This can be accomplished in the present transmission by locking out the overrunning clutch.

The assembly of which the auxiliary transmission C forms a part is particularly well suited for exceptionally heavy duty use, with vehicles having either single or multiple engine power and either wheel or endless track ground-engaging gear.

The friction clutch A is located immediately behind the engine between the rear end of the crank shaft 10 of the engine and the input shaft 11 of the torque converter B. It includes a face plate 12 which is formed as a part of the flywheel of the engine, an axially movable pressure plate 13 carried by the face plate, a driven disk 14 between the face plate and the pressure plate, which disk is secured to the input shaft 11 of the torque converter, and a foot pedal 15 or other device for use in releasing the clutch.

The torque converter B is located at the rear end of the friction clutch A and includes—in addition to the input shaft 11—an output shaft 16, and cooperating fluid handling vanes 17 and 18 associated respectively with said shafts for transmitting torque between the same under a multiplication, which multiplication is initially high but progressively decreases as the inertia of the load is overcome and the speed of the output shaft 16 increases.

The auxiliary transmission C is located at the rear end of the torque converter B. It includes a driving shaft 19, in the form of a rearward continuation of the output shaft 16 of the converter B, and a driven shaft 20 which is offset with respect to the driving shaft 19 in downwardly spaced parallel relation to the latter. The driven shaft 20 terminates at its rear end in a bevel gear 21 which is operably connected with the mechanism used in driving the wheels or other ground-engaging means of the vehicle. The driving shaft 19 carries a large gear 22 and a small gear 23. These gears are both fixedly secured to the shaft 19 and turn at all times with the latter.

The gear 22 on the driving shaft 19 meshes downwardly with a small gear 24 which is journaled on the driven shaft 20. Under normal operating conditions the gear 24 is non-rotatably connected with the driven shaft 20 by a clutch member 25 which is splined to the driven shaft and is shiftable forwardly along the same into a position in which a set of jaw teeth 26 on the front face of the clutch member are in circumferentially interlocked engagement with a complementary set of jaw teeth 27 on the rear face of the otherwise freely rotatable gear 24.

The clutch member 25 is resiliently urged at all times into clutched engagement with the gear 24 by the torsional action of a spring 28 (see Fig. 3), but can be withdrawn quickly from such engagement by the operator through the manipulation of a foot pedal 29 (see Fig. 2) or other device. When the clutch member 25 is in its forwardly clutched position the gear 24 will be fixedly connected with the driven shaft 20 through the clutch member and the auxiliary transmission will be in its normal or "high gear" ratio.

The gear 23 on the driving shaft 19 meshes downwardly with a gear 30 on the driven shaft 20. The gear 30, which is considerably larger than the gear 24, is not connected directly with the driven shaft 20 but is secured to the inner member 31 of an overrunning clutch unit 32 on the driven shaft. The unit 32 may be constructed in the manner disclosed and claimed in my abandoned application Serial No. 297,439 filed December 26, 1941. The inner member 31 of the unit is journaled on the driven shaft 20 and is surrounded by the outer member 33 of the unit. A plurality of circumferentially spaced rollers 34—possibly twenty in number—are positioned between the outer multiple-cam periphery of the inner member 31 and the inner cylindrical periphery of the outer member 33. The rollers 34 are separated from each other at regularly spaced intervals by an annular carrier 35. The carrier 35 is acted upon by a spring 36 which tends to cause the rollers 34 to move along the cam surfaces presented by the outer periphery of the inner member 31 into wedged engagement with the inner periphery of the outer member 33, whereby to allow free rotation of the inner member 31 with the gear 30 in one direction relative to the outer member 33 while preventing rotation of the inner member 31 and the gear 30 in the opposite direction relative to the outer member 33.

The outer member 33 of the overrunning clutch unit 32 is adapted to be clutched to the driven shaft 20 by a clutch member 37. The clutch member 37 is splined to the driven shaft 20 and is shiftable forwardly along the same into a position in which a set of jaw teeth 38 on the front face of the clutch member are in circumferentially interlocked engagement with a complementary set of jaw teeth 39 on the rear edge of the otherwise freely rotatable outer member 33.

The previously described clutch member 25, in addition to being shiftable forwardly along the driven shaft 20 to connect the gear 24 to that shaft—is also shiftable rearwardly from its intermediate or neutral position (shown in Fig. 1) into a position in which a second set of jaw teeth 40 on the rear edge of the same are in circumferentially interlocked engagement with a complementary set of jaw teeth 41 on the front face of the gear 30. This shift—which is effected during a momentary release of the engine clutch A and an easing up on the throttle to reduce the speed of the gear 30 to approximately that of the driven shaft 20—locks out the overrunning clutch unit 32 and connects the gear 30 non-rotatably with the driven shift, providing a fixed low gear ratio which can be used if desired for braking purposes.

The reversing means includes a small gear 42 which is splined on the driving shaft 19 near the rear end of the latter. When the auxiliary transmission C is to be placed in reverse, the clutch A is released momentarily, the clutch members 25 and 37 are shifted into their neutral positions (as shown in Fig. 1) if not already in such positions, and the gear 42 is shifted forwardly from its neutral position (as shown in Fig. 1) into mesh with a gear 43 which is rotatably mounted on a short counter-shaft 44 located to one side of the driving shaft 19. The gear 43 is connected with a rearwardly disposed gear 45 which meshes with a large gear 46 formed on the outer periphery of the clutch member 37. Consequently, when the gear 42 is shifted forwardly into mesh with the gear 43 a reverse drive will be established between the driving and driven shafts 19 and 20 through the gears 42, 43, 45 and 46.

The gear 42 is a dual purpose gear. When shifted forwardly from its neutral position it functions in the above described manner as a reversing gear. When shifted rearwardly from its neutral position it functions in a different manner as a very low ratio creeper gear.

The establishment of this very low ratio enables the operator to cause the vehicle to creep forwardly at a very slow rate of speed under a high multiplication of torque whenever emergency conditions make such progress advisable. To place the transmission in this emergency low gear or creeper ratio—a ratio considerably lower than the previously described low gear ratio obtainable through the gears 23 and 30—the gear 42 is shifted rearwardly from its neutral position into direct mesh with the gear 46 on the clutch member 37, the clutch member 37 at that time of course being in its neutral position. Before shifting into the creeper ratio the operator should bring the vehicle to a full stop (if it is not already at rest) and momentarily release the clutch A.

The control means for the auxiliary transmission C includes three shifting forks 47, 48 and 49 (see Fig. 2), which forks engage respectively within annular grooves 50, 51 and 52 provided on hub portions associated respectively with the clutch member 25, the clutch member 37, and the dual purpose gear 42.

The fork 47 which operates the clutch member 25 is fixedly secured to a rotatably mounted crossrod 53 (see Fig. 3). The previously mentioned spring 28 encircles this cross-rod and is connected at one of its ends to the casing 54 of the transmission and at its other end to the fork 47, with the spring wound under tension in such direction as to urge the fork 47 to pivot forwardly at all times. The previously mentioned foot pedal 29 is connected by a link 55 to an upstanding arm 56 which is fixedly secured to the projecting end of the cross-rod 53. Another upstanding arm 57 is pivotally mounted at its lower end on the cross-rod 53 and is provided with a hub portion 58 having a stop 59 for engagement with a small radially projecting lug 60 on the cross-rod 53. The arm 57 is adapted to be contracted at its upper end by the lower end 61 of a bell crank lever 62. The bell crank lever 62 is rotatably mounted intermediate its ends on a stud 63 and is pivotally connected at its upper end 64 to an axially movable shifting rod 65.

The fork 48 which operates the clutch member 37 is fixedly secured to the shifting rod 65 at a point rearwardly of the bell crank lever 62.

The fork 49 which operates the gear 42 is fixedly secured to another axially movable shifting rod 66 which is located in horizontally spaced parallel relation to the rod 65. The rods 65 and 66 are connected with an ordinary gear shift lever (not shown) in the usual manner, whereby either of the rods can be shifted at will but each is prevented from being shifted from its neutral position into any other position until after the other rod has first been shifted into its neutral position, this being accomplished by cross-locking means well known in the art.

When the rod 65 is shifted forwardly from its neutral position (shown in Fig. 2) into its forward position, the fork 48 will cause the clutch member 37 to connect the outer member 33 of the overrunning clutch unit 32 with the driven shaft 20, and the lower end 61 of the bell crank lever 62 will at the same time be moved rearwardly out of the way of the upper end of the arm 57, allowing the spring 28 to cause the clutch member 25 to connect the gear 24 with the driven shaft 20. In this normal or high speed condition of the auxiliary transmission C the torque from the engine after leaving the torque converter B will be transmitted from the driving shaft 19 to the driven shaft 20 by way of the high ratio gears 22 and 24. At the same time the gear 23 on the driving shaft 19 will be rotating gear 30 but at a lower speed, resulting in the outer member 33 of the overrunning clutch unit 32 turning at a higher speed than the inner member 31 connected with the gear 30.

When an obstruction or an unusually steep grade is reached the operator may drop the transmission quickly into low gear by pressing the pedal 29 down far enough to unclutch the gear 24 from the driven shaft 20 and instantly following up such action by stepping on the accelerator of the engine to increase the speed of rotation of the driving shaft 19. As soon as the gear 24 is released in this manner from its connection with the driven shaft 20 and the engine accelerated, the multiple roller clutch of the overrunning clutch unit 32 will take up the drive through the low ratio gears 23 and 30.

If the operator for any reason wishes to lock out the overrunning clutch unit 32 while operating through such unit in the above described low gear ratio, whereby to fix that ratio and thus enable the transmission to be used in braking, as when going down a steep incline, he may do so very easily by merely depressing the pedal 29 still farther, whereupon the clutch member 25 will move into clutched engagement with the gear 30, locking that gear to the driven shaft 20. If during this locking out period the clutch teeth 40 tend to abut against the clutch teeth 41 a momentary easing or joggling of the accelerator will cause sufficient relative movement between the two sets of teeth to enable them to mesh fully with each other.

When the transmission is to be placed in reverse, the rod 65 is shifted rearwardly to place the clutch members 25 and 37 in their neutral positions, after which the rod 66 is shifted forwardly from its neutral position to move the gear 42 into mesh with the gear 43.

When the transmission is to be placed in its emergency low gear or creeper ratio, the vehicle is brought to a stop, the clutch A released, and the rod 65 shifted rearwardly to place the clutch members 25 and 37 in their neutral positions, after which the rod 66 is shifted rearwardly from its neutral position to move the gear 42 into mesh with the gear 46.

I claim:

1. In a transmission of the character described, a driving shaft, a driven shaft arranged in spaced parallel relation to the driving shaft, two gears secured to the driving shaft, a high speed gear journaled on the driven shaft in mesh with one of said gears on the driving shaft, a low speed gear mounted on the driven shaft in mesh with the other of said gears on the driving shaft, shiftable clutch means on the driven shaft for releasably connecting either said high speed gear or said low speed gear with the driven shaft, overrunning clutch means on the driven shaft having one element secured to said low speed gear, other shiftable clutch means on the driven shaft for releasably connecting the other element of the overrunning clutch means with the driven shaft, manually operable control means for shifting the first and last named clutch means into their disengaged positions, and other manually operable control means for shifting the first named clutch means to release said high speed gear from the driven shaft without disengaging the second mentioned clutch means, whereby to transfer the drive immediately from said high speed gear to said low speed gear through the pick up afforded by the overrunning clutch means.

2. In a transmission of the character described, a driving shaft, a driven shaft arranged in spaced parallel relation to the driving shaft, two gears secured to the driving shaft, a high speed gear journaled on the driven shaft in mesh with one of said gears on the driving shaft, a low speed gear mounted on the driven shaft in mesh with the other of said gears on the driving shaft, shiftable clutch means on the driven shaft for releasably connecting either said high speed gear or said low speed gear with the driven shaft, overrunning clutch means on the driven shaft having one element secured to said low speed gear, other shiftable clutch means on the driven shaft for releasably connecting the other element of the overrunning clutch means with the driven shaft, manually operable control means for shifting the first and last named clutch means into their disengaged positions, and other manually operably control means for shifting the first named clutch means to release said high speed gear from the driven shaft without disengaging the second mentioned clutch means, whereby to transfer the drive immediately from said high speed gear to said low speed gear through the pick up afforded by the overrunning clutch means, said last named control means upon further manipulation actuating the first mentioned clutch means to connect said low speed gear directly with the driven shaft.

3. In a transmission of the character described, a driving shaft, a driven shaft arranged in spaced parallel relation to the driving shaft, two gears secured to the driving shaft, a high speed gear journaled on the driven shaft in mesh with one of said gears on the driving shaft, a low speed gear mounted on the driven shaft in mesh with the other of said gears on the driving shaft, shiftable clutch means on the driven shaft for releasably connecting said high speed gear with the driven shaft, overrunning clutch means on the driven shaft having one element secured to said low speed gear, other shiftable clutch means on the driven shaft for releasably connecting the other element of the overrunning clutch means with the driven shaft, a third gear non-rotatably but shiftably mounted on the driving shaft, a counter-shaft, a gear on the counter-shaft with which said third gear is adapted to be shifted into mesh, another gear on the counter-shaft connected with the first named gear on that shaft, and a gear non-rotatably connected with the driven shaft in mesh with the last named gear on the counter-shaft.

4. In a transmission of the character described, a driving shaft, a driven shaft arranged in spaced parallel relation to the driving shaft, two gears secured to the driving shaft, a high speed gear journaled on the driven shaft in mesh with one of said gears on the driving shaft, a low speed gear mounted on the driven shaft in mesh with the other of said gears on the driving shaft, shiftable clutch means on the driven shaft for releasably connecting said high speed gear with the driven shaft, overrunning clutch means on the driven shaft having one element secured to said low speed gear, other shiftable clutch means on the driven shaft for releasably connecting the other element of the overrunning clutch means with the driven shaft, a third gear non-rotatably but shiftably mounted on the driving shaft, a counter-shaft, a gear on the counter-shaft with which said third gear is adapted to be shifted into mesh, another gear on the counter-shaft connected with the first named gear on that shaft, and a gear non-rotatably connected with the driven shaft in mesh with the last named gear on the counter-shaft, said last named gear being mounted on the last named shiftable clutch means.

5. In a transmission of the character described, a driving shaft, a driven shaft arranged in spaced parallel relation to the driving shaft, two gears secured to the driving shaft, a high speed gear journaled on the driven shaft in mesh with one of said gears on the driving shaft, a low speed gear mounted on the driven shaft in mesh with the other of said gears on the driving shaft, shiftable clutch means on the driven shaft for releasably connecting said high speed gear with the driven shaft, overrunning clutch means on the driven shaft having one element secured to said low speed gear, other shiftable clutch means on the driven shaft for releasably connecting the other element of the overrunning clutch means with the driven shaft, a third gear non-rotatably but shiftably mounted on the driving shaft, a counter-shaft, a gear on the counter-shaft with which said third gear is adapted to be shifted in one direction into mesh, another gear on the counter-shaft connected with the first named gear on that shaft, and a gear non-rotatably connected with the driven shaft in mesh with the last named gear on the counter-shaft, said third gear on the driving shaft being also adapted to be shifted in the opposite direction into direct mesh with the last named gear on the driven shaft.

6. In a transmission of the character described, a driving shaft, a driven shaft arranged in spaced parallel relation to the driving shaft, two gears secured to the driving shaft, a high speed gear journaled on the driven shaft in mesh with one of said gears on the driving shaft, a low speed gear mounted on the driven shaft in mesh with the other of said gears on the driving shaft, shiftable clutch means on the driven shaft for releasably connecting said high speed gear with the driven shaft, overrunning clutch means on the driven shaft having one element secured to said low speed gear, other shiftable clutch means on the driven shaft for releasably connecting the other element of the overrunning clutch means with the driven shaft, a third gear non-rotatably but shiftably mounted on the driving shaft, a countershaft, a gear on the counter-shaft with which said third gear is adapted to be shifted in one direction into mesh, another gear on the counter-shaft connected with the first named gear on that shaft, and a gear non-rotatably connected with the driven shaft in mesh with the last named gear on the counter-shaft, said third gear on the driving shaft being also adapted to be shifted in the opposite direction into direct mesh with the last named gear on the driven shaft, and said last named gear on the driven shaft being mounted on the last named shiftable clutch means.

OSCAR H. BANKER.

REFERENCES CITED

The following references are of record in the file of this patent:

UNITED STATES PATENTS

| Number | Name | Date |
| --- | --- | --- |
| 1,233,877 | Henderson | July 17, 1917 |
| 1,969,289 | Ackerman | Aug. 7, 1934 |
| 2,018,032 | Raven | Oct. 22, 1935 |
| 2,056,365 | Raven | Oct. 6, 1936 |
| 2,097,569 | Kilpela | Nov. 2, 1937 |
| 2,113,088 | Jonsson | Apr. 5, 1938 |
| 2,118,853 | Meech | May 31, 1938 |
| 2,156,336 | Haigh | May 2, 1939 |
| 2,343,312 | Maurer | May 7, 1944 |